United States Patent [19]
Ueda

[11] Patent Number: 6,163,633
[45] Date of Patent: Dec. 19, 2000

[54] OPTICAL WAVEGUIDE SWITCH HAVING PELTIER JUNCTION CONTROL ELEMENTS

[75] Inventor: Tetsuji Ueda, Tokyo, Japan

[73] Assignee: NEC Corporation, Tokyo, Japan

[21] Appl. No.: 09/086,038

[22] Filed: May 28, 1998

[30]     Foreign Application Priority Data

May 28, 1997 [JP] Japan ..................................... 9-138988

[51] Int. Cl.⁷ ............................. G02B 6/26; G02F 1/025; G01B 1/02
[52] U.S. Cl. .................................. 385/16; 385/1; 356/345
[58] Field of Search ........................... 385/16, 1; 356/345

[56]            References Cited

U.S. PATENT DOCUMENTS

| 5,016,958 | 5/1991 | Booth ......................................... 385/16 |
| 5,117,470 | 5/1992 | Inoue et al. .................................. 395/1 |

FOREIGN PATENT DOCUMENTS

| 59-75228 | 4/1984 | Japan . |
| 4504473 | 8/1992 | Japan . |
| 8306968 | 11/1996 | Japan . |

OTHER PUBLICATIONS

Office Action Issued by the Japanese Patent Office on Dec. 1, 1998 and a Translation thereof.

*Primary Examiner*—Jon Henry
*Attorney, Agent, or Firm*—Ostrolenk, Faber, Gerb & Soffen, LLP

[57]            ABSTRACT

A optical switch comprising: a substrate; and a Mach-Zehnder interferometer circuit provided on the substrate, the Mach-Zehnder interferometer circuit comprising two directional couplers and two optical transmission lines for connecting the directional couplers to each other; elements having Peltier effect provided respectively on the two optical transmission lines; and energizing means for energizing the elements in such a manner that heat is generated from one of the elements with absorption of heat being created in the other element. By virtue of the above construction, the optical switch can realize low power consumption, low extinction ratio, and low crosstalk.

16 Claims, 4 Drawing Sheets a, b : TRANSMISSION LIGHTS
① TO ④ : PORTS
1 : MACH-ZEHNDER INTERFEROMETER CIRCUIT
2, 3 : DIRECTIONAL COUPLER
4 : ARM (OPTICAL WAVEGUIDE)
5 : ARM (OPTICAL WAVEGUIDE)
6 : PELTIER ELEMENT
7 : PELTIER ELEMENT a, b : TRANSMISSION LIGHTS
① TO ④ : PORTS
14 : MACH-ZEHNDER INTERFEROMETER CIRCUIT
15, 16: DIRECTIONAL COUPLERS
17, 18: ARMS
19, 20: HEATERS
23a, 23b, 23c, 23d : ELECTRODES

17′, 18′ : CORES
19, 20 : HEATERS
21: CLADDING
22 : SUBSTRATE a, b : TRANSMISSION LIGHTS
① TO ④ : PORTS
1 : MACH-ZEHNDER INTERFEROMETER CIRCUIT
2, 3 : DIRECTIONAL COUPLER
4 : ARM (OPTICAL WAVEGUIDE)
5 : ARM (OPTICAL WAVEGUIDE)
6 : PELTIER ELEMENT
7 : PELTIER ELEMENT

4 : ARM (OPTICAL WAVEGUIDE)
4' : CORE
5 : ARM (OPTICAL WAVEGUIDE)
5' : CORE
6 : PELTIER ELEMENT
6', 6" : JUNCTIONS
7 : PELTIER ELEMENT
7', 7" : JUNCTIONS
8 : CLADDING
9 : SUBSTRATE
10 : DIRECT CURRENT SOURCE (ENERGIZING MEANS)
11a, 11b, 11c, 11d : ELECTRODES
12, 13 : HEAT SINKS

OPTICAL WAVEGUIDE SWITCH HAVING PELTIER JUNCTION CONTROL ELEMENTS

FIELD OF THE INVENTION

The invention relates to an optical switch, and more particularly to an optical switch that can realize low power consumption, low extinction ratio, and low crosstalk.

BACKGROUND OF THE INVENTION

A quartz-based optical waveguide has such a property that the effective refractive index n of a core changes with a temperature change. This thermooptic effect may be expressed by the following equation (1).

$$n = n0 + \alpha \Delta t \quad (1)$$

wherein n0 represents the effective refractive index before temperature change; $\Delta t$ represents temperature change; and $\alpha$ represents thermooptic effect.

A quartz-based optical waveguide switch comprises a Mach-Zehnder interferometer circuit. The Mach-Zehnder interferometer circuit comprises two 3-dB directional couplers and two arms (optical waveguides) for connecting the two directional couplers to each other. Cores serving as the arms are provided in the interior of cladding, and heaters are provided on the top surface of the cladding in its portions corresponding to the respective cores.

According to this optical switch, switching is performed in such a manner that heat is generated from one of the two heaters to create a difference in temperature between the cores, thereby changing the effective refractive index n of one of the cores to shift the phase of light propagating through the core by a half-wavelength, which permits the optical path to be switched. The other heater is used for adjusting the wavelength on the reference side when the adjustment by means of the heater used for the switching is unsatisfactory.

The optical output characteristics of the Mach-Zehnder interferometer circuit 14 may be expressed by the following equations (2) and (3).

$$P1 = (1-2k)2 \cos 2(\Delta\phi/2) + \sin 2(\Delta\phi/2) \quad (2)$$

$$P2 = 4k(1-k)\cos 2(\Delta\phi/2) \quad (3)$$

wherein $\Delta\phi$ represents phase difference between two arms and k represents the degree of coupling of the directional coupler.

The phase difference between the two arms may be expressed by the formula (4).

$$\Delta\phi = 2\pi 1 \Delta n / \lambda \quad (4)$$

wherein 1 represents length of heater, $\Delta n$ represents difference in effective refractive index between two arms, and $\lambda$ represents transmission wavelength.

For example, when k of the 3-dB directional coupler is 0.5 with the heater being turned off ($\Delta\phi=0$), P1 is 0 and P2 is 1. In this case, the light is allowed to advance toward a crossport P2. On the other hand, when the heater is turned on to heat one of the arms so as to give $1\Delta n = \lambda/2(\Delta\phi=\pi)$, P1 is 1 with P2 being 0, performing switching. This permits the light to advance toward a throughport P1.

On the other hand, for example, Japanese Patent Laid-Open No. 75228/1984 discloses one example of the 1×2 optical switch.

This optical switch comprises: a substrate made of soda glass; a Y-branched optical waveguide provided on the substrate; and a heat generating section and a heat absorbing section each, comprising dissimilar conductors or semiconductors jointed to each other, having Peltier effect, the heat generating section and the heat absorbing section being provided on both sides of the optical waveguide before the Y-branching point. In this case, the dissimilar conductors having Peltier effect are a thin layer of silver (Ag) and a thin layer of copper (Cu) formed by vapor deposition so as to partially overlap with each other.

The prior art techniques, however, had the following problems.

The first problem is derived from the fact that, in the conventional quartz-based optical waveguide type 2×2 optical switch, a difference in temperature between the two arms to perform switching is created by heating both the arms by means of respective heaters to raise the temperature.

For example, when the temperature on the reference side is raised due to a rise in environmental temperature, the arm on the higher temperature side should be further heated with the heater, leading to increased power consumption. Further, when the environmental temperature reaches the maximum service temperature of a module, for example, 65° C., the arm on the higher temperature side should be further heated, leading to a fear of an adverse effect on an adhesive or the like used in mounting.

Thus, in the conventional 2×2 optical switch, both the two heaters are heated to create a difference in temperature between the two arms, making it difficult to efficiently conduct switching.

The second problem is that in the conventional Y-shaped 1×2 optical switch, the extinction ratio is poor and the crosstalk is large.

The reason for this is that, in the above Y-shaped optical switch, a change in refractive index derived from a temperature change is created within the same core before branching into a Y shape to confine the light within the same core on its side with the refractive index being increased, thereby performing switching. For this reason, some of the light propagating through the core on its side with the refractive index being lowered is radiated toward the cladding.

Further, since the refractive index is changed within the core in its central portion, the temperature control effect of the heat generating section and the heat absorbing section having the Peltier effect interact with each other, making it difficult to create a difference in temperature therebetween. Therefore, at the central portion where the refractive index is created, a possible change in refractive index within the core is merely a broad one, so that the light cannot be confined within the optical waveguide on its one side to such an extent that the light can be confined within the core at the interface of the cladding and the core.

This causes some of the light propagating through the core leaks out toward the cladding and the opposite port, resulting in poor extinction ratio and large crosstalk.

The third problem is that, in the conventional Y-shaped optical switch, the power consumption is large.

This is because, with no current flowing, the above structure functions only as a Y-branched splitter, making it necessary to always supply current for performing switching.

Thus, when use of the structure as a switching device is contemplated, current should be always supplied, leading to large power consumption.

The fourth problem is that the conventional Y-shaped optical switch requires the provision of a circuit for changing the direction of current.

As described above, the reason for this is that, in order to perform switching, the direction of current should be changed and the distribution of the refractive index should be changed symmetrically with respect to the central portion of the optical waveguide.

SUMMARY OF THE INVENTION

Accordingly, it is an object of the present invention to provide an optical switch that can realize low power consumption, low extinction ratio, and low crosstalk.

According to the invention, an optical switch, comprises:
a Mach-Zehnder interferometer circuit comprising two directional couplers and two optical transmission lines for connecting the directional couplers to each other;
elements having Peltier effect provided respectively on the two optical transmission lines; and
energizing means for energizing the elements so that heat is generated from one of the elements with absorption of heat being created in the other element.

In the preferred embodiment, the elements are either p-type or n-type semiconductors having the same thermoelectric effect.

In the preferred embodiment, the semiconductor is composed mainly of a p-type $(Bi, Sb)_2Te_3$.

In the preferred embodiment, the semiconductor is composed mainly of an n-type $Bi_2(Te, Se)_3$.

In the preferred embodiment, the elements are conductors having the same thermoelectric effect.

In the preferred embodiment, the conductor comprises dissimilar metals jointed to each other.

In the preferred embodiment, at least one of the metals is a noble metal.

In the preferred embodiment, the noble metal is any one of gold, silver, and platinum.

In the preferred embodiment, the Mach-Zehnder interferometer circuit is provided on a substrate.

In the preferred embodiment, the optical transmission line is an optical waveguide.

In the preferred embodiment, the optical waveguide is made of glass composed mainly of quartz.

In the preferred embodiment, the optical waveguide comprises: a substrate; a cladding provided on the substrate; and a core provided in the interior of the cladding.

In the preferred embodiment, the core comprises a quartz glass with germanium added thereto and the cladding comprises a quartz glass with germanium not added thereto.

In the preferred embodiment, the cladding comprises a quartz glass with fluorine added thereto and the core comprises a quartz glass with fluorine not added thereto.

In the preferred embodiment, the energizing means is a direct current source.

In the preferred embodiment, the optical transmission line to be heated is shorter than the optical transmission line to be cooled.

In the preferred embodiment, a heat sink is provided on the element.

In the preferred embodiment, an element having Peltier effect is provided on each of the two optical transmission lines, and the elements are provided with an energizing means that, upon energization, heat is generated from one of the elements with heat being absorbed in the other element. Therefore, upon flow of a current through these elements by the energizing means, heat is generated from one of the elements, permitting the optical transmission line provided with this element to be heated. Consequently, the temperature is raised, resulting in increased refractive index.

In this case, the absorption of heat occurs in the other element, permitting the optical transmission line provided with this element to be cooled. Consequently, the temperature is lowered, resulting in lowered refractive index. Thus, transmission light is distributed by the input directional coupler into two optical transmission lines, and a difference in phase between two distributed transmission lights is created due to the difference in refractive index between these optical transmission lines.

The transmission lights propagated through the optical transmission lines are coupled together by means of an output directional coupler. The coupled light is allowed to advance toward a crossport when the phase difference is brought to zero ($\Delta\phi=0$), while it is allowed to advance toward a throughport when the phase difference is such that the phase of light is shifted by half-wavelength ($\Delta\phi=\pi$).

Thus, upon energization of two elements having Peltier effect, a difference in temperature can efficiently created between the two optical transmission lines, resulting in a large difference in refractive index between the two optical transmission lines. This realizes operation at low power consumption.

The optical switch basically comprises a Mach-Zehnder interferometer circuit comprising two directional couplers and two optical transmission lines for connecting the directional couplers to each other. This construction enables a plurality of input ports to be provided. Further, bidirectional input and output of light can be carried out, realizing bidirectional switching. Furthermore, since the switching efficiency can be improved, low extinction ratio and low crosstalk can be realized.

In the preferred embodiment, the optical transmission line to be heated is shorter than the optical transmission line to be cooled. Therefore, very weak current may be allowed to flow through the two elements having Peltier effect, permitting the phase of light propagating through one of the optical transmission line to be rendered identical to the phase of light propagating through the other optical transmission line. This can reduce crosstalk involved in switching of output light output through the crossport.

In the preferred embodiment, the provision of the heat sink on the element improves the flow of heat into the element and hence enables the optical transmission line to be efficiently heated or cooled.

BRIEF DESCRIPTION OF THE DRAWINGS

The invention will be explained in more detail in conjunction with appended drawings, wherein.

DESCRIPTION OF THE PREFERRED EMBODIMENT

Before explaining an optical switch in the preferred embodiment according to the invention, the aforementioned conventional optical switch will be explained in FIGS. 1 and 2.

Figure 1:
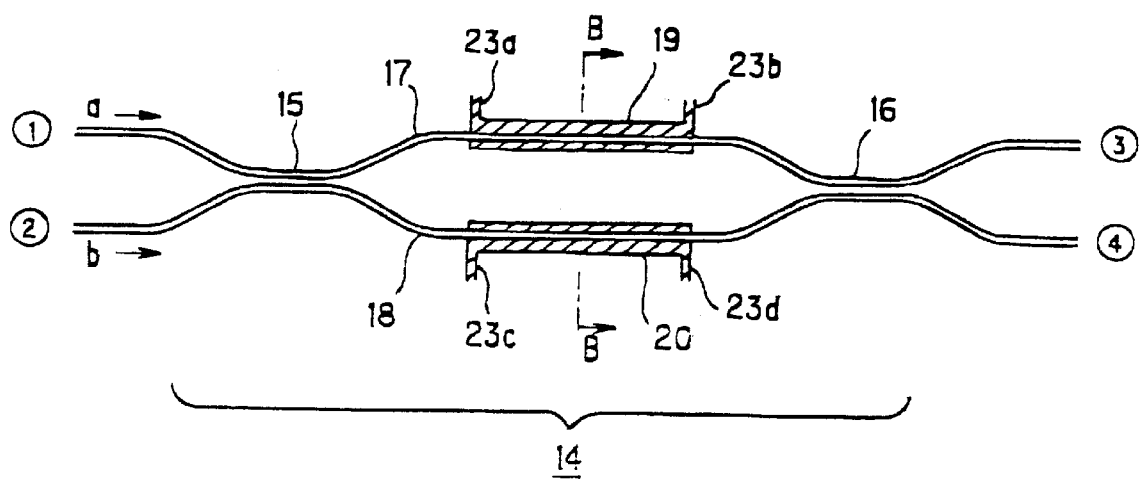
FIG. 1 is a plan view of a conventional optical switch.
Figure 2:
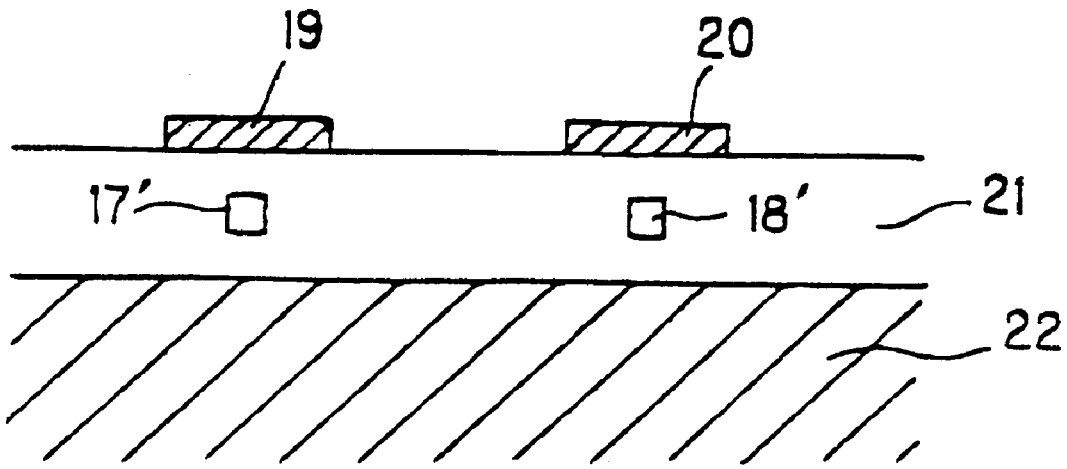
FIG. 2 is a cross-sectional view taken on line B—B of FIG. 2.

FIG. 1 is a plan view of a conventional quartz-based optical waveguide type 2×2 optical switch utilizing the thermooptic effect, and FIG. 2 a cross-sectional view taken on line B—B of FIG. 1.

This quartz-based optical waveguide type optical switch comprises a Mach-Zehnder interferometer circuit 14 comprising two 3-dB directional couplers 15, 16 and two arms (optical waveguides) 17, 18 for connecting these directional couplers to each other. As shown in FIG. 2, cores 17', 18' serving as the arms are provided in the interior of cladding 21, and heaters 19, 20 are provided on the top surface of the cladding 21 in its portions corresponding respectively to the cores 17', 18'. In these drawings, numeral 22 designates a substrate, numerals 23a, 23b electrodes provided on the heater 19, numerals 23c, 23d electrodes provided on the heater 20, and numerals to ports.

In this optical switch, switching is performed in such a manner that heat is generated from one of the two heaters 19, 20 to create a difference in temperature between the cores 17', 18', thereby changing the effective refractive index n of one of the cores 17', 18' to shift the phase of light propagating through the core by a half-wavelength, which permits the optical path to be switched. The other heater of the heaters 19, 20 is used for adjusting the wavelength on the reference side when the adjustment by means of the heater used for the switching is unsatisfactory.

The optical output characteristics of the Mach-Zehnder interferometer circuit 14 may be expressed by the above equations (2) and (3), and the phase difference between the two arms may be expressed by the above equation (4).

As described above, however, in the conventional quartz-based optical waveguide type 2×2 optical switch as shown in FIGS. 1 and 2, a difference in temperature between the two arms 17, 18 is created to perform switching by heating both the arms 17, 18 by means of respective heaters 19, 20 to raise the temperature.

For example, when the temperature on the reference side is raised due to a rise in environmental temperature, the arm on the higher temperature side should be further heated with the heater, leading to increased power consumption. Further, when the environmental temperature reaches the maximum service temperature of a module, for example, 65° C., the arm on the higher temperature side should be further heated, leading to a fear of an adverse effect on an adhesive or the like used in mounting.

Thus, in the conventional 2×2 optical switch, both the two heaters 19, 20 are heated to create a difference in temperature between the two arms 17, 18, making it difficult to efficiently conduct switching.

Next, an optical switch in the preferred embodiment according to the invention will be explained in FIGS. 3 and 4.

Figure 3:
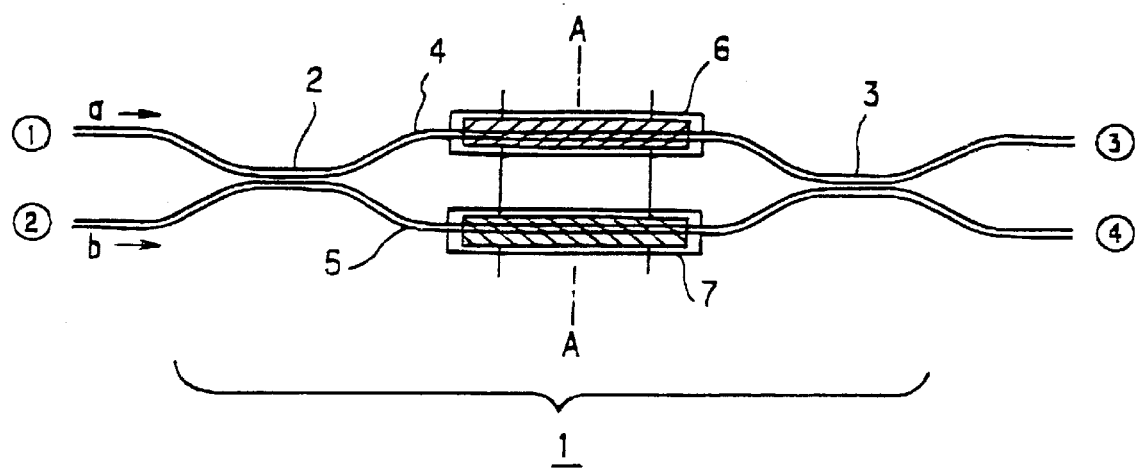
FIG. 3 is a plan view of an optical switch according to a preferred embodiment of the present invention.
Figure 4:
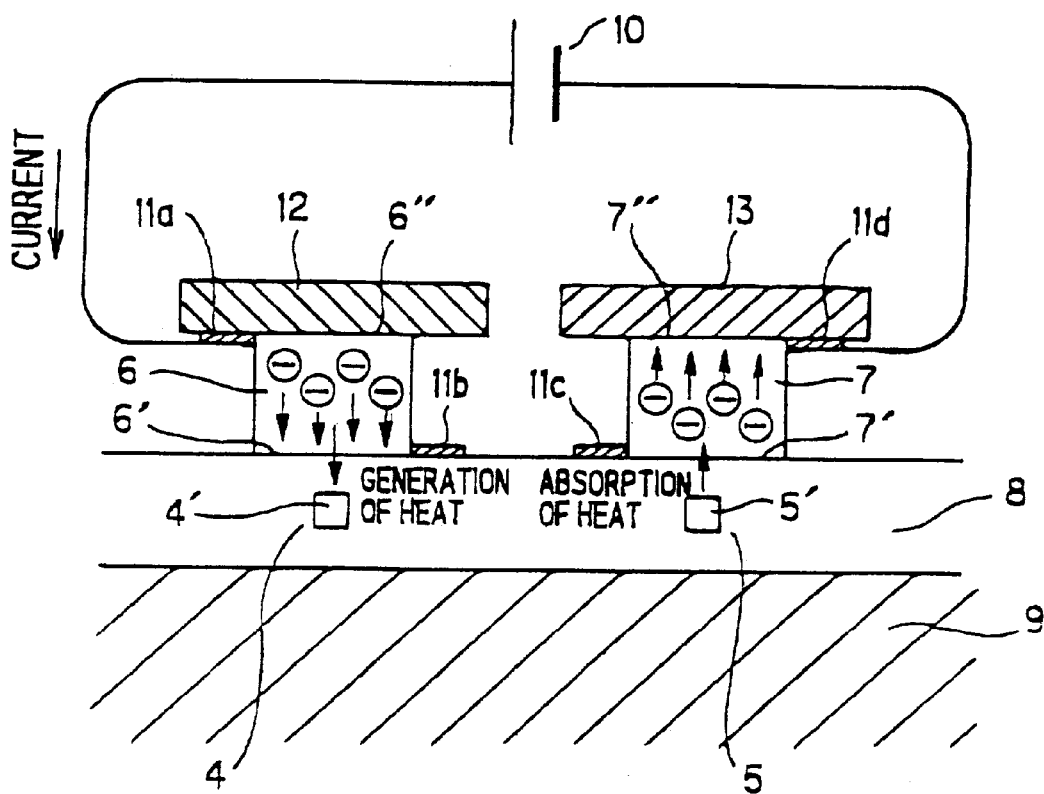
FIG. 4 is a cross-sectional view taken on line A—A of FIG. 3.

FIG. 3 is a plan view of an optical switch according to a preferred embodiment of the present invention, and FIG. 4 a cross-sectional view taken on line A—A of FIG. 3.

This optical switch comprises a Mach-Zehnder interferometer circuit 1. The Mach-Zehnder interferometer circuit 1 comprises two 3-dB directional couplers 2, 3 designed according to wavelength of light to be transmitted and two arms (optical waveguides) 4, 5 for connecting these couplers 2, 3 to each other. Peltier elements 6, 7 of the same type (p-type or n-type) are separately disposed respectively on the arms 4, 5 and wired electrically in series.

The circuit spacing between the two arms 4, 5 is satisfactorily wider than the circuit spacing between the 3-dB directional couplers 2, 3, creating no optical coupling. The two arms 4, 5 may have the same length or are such that the arm on the higher temperature side is somewhat shorter than the arm on the lower temperature side so that the regulation of heat by the Peltier element can offer an identical phase.

Peltier elements 6, 7 are each a reversible element that can be locally heated or cooled by bringing the direction of current to a forward direction or a reverse direction and comprises either a p-type semiconductor or an n-type semiconductor having thermoelectric effect. According to this embodiment, two semiconductor of the same type having thermoelectric effect are used. For example, $(Bi, Sb)_2Te_3$ may be used as the p-type semiconductor, and $Bi_2(Te, Se)_3$ may be used as the n-type semiconductor.

Further, as shown in FIG. 4, cores 4', 5', made of glass composed mainly of quartz ($SiO_2$), serving as the arms are provided on a silicon substrate 9 so that the cores 4', 5' are included in the cladding 8.

For the cores 4', 5', a material is suitable which has low propagation loss in transmission light and higher refractive index than the cladding 8, for example, quartz glass with a material capable of enhancing the refractive index, such as germanium (Ge), being added thereto.

Alternatively, the cladding 8 may be made of quartz glass with fluorine (F) being added thereto, while the cores 4', 5' may be made of quartz glass with no fluorine being added thereto.

The Peltier elements 6, 7 are provided separately from each other on the top surface of the cladding 8 in its portions corresponding respectively to the cores 4', 5', electrically wired in series through electrodes 11a, 11b, 11c, and 11d, and connected to a direct current source (energizing means) 10.

Heat sinks 12, 13 are provided respectively on the Peltier elements 6, 7.

Next, the operation of the optical switch will be described in detail with reference to FIGS. 3 and 4.

An input light signal "a" coupled to an input a port 1 is equally distributed into two arms 4, 5 through a 3-dB directional coupler 2 designed according to the wavelength of the light. The equally distributed transmission lights are respectively confined within and propagated through the cores 4', 5' by utilizing a difference in refractive index between the cores 4', 5' and the cladding 8. With the direct current source 10 being turned off, the transmission light a is propagated through the arms 4, 5 in the same phase. For this reason, the distributed and propagated lights are recoupled together by means of an output 3-dB directional coupler 3, and the recoupled light is output through a port 4 on the crossport side. Likewise, an input light signal "b" coupled to an input a port 2 is output through a port 3 on the crossport side.

In this case, as shown in FIG. 4, when p-type Peltier elements 6, 7 are provided and a direct current source 10 is driven to allow a current to flow so that a Peltier element 6 is made positive with a Peltier element 7 being made negative, the Peltier elements 6, 7 create thermoelectric effect. In the Peltier element 6, due to the Peltier effect, the absorption of heat occurs in the upper part thereof, while the generation of heat occurs in the lower part thereof. This permits heat to be pumped from the upper part to the lower part. On the other hand, in the Peltier element 7, the generation of heat occurs in the upper part, while the absorption of heat occurs in the lower part. Therefore, in the Peltier element 6, a junction 6' serves as a heat generating section, while a junction 6'' on the opposite side serves as a heat absorbing section. Likewise, in the Peltier element 7, a junction 7' serves as a heat absorbing section, while a junction 7'' on the opposite side serves as a heat generating section.

Thus, a core 4' facing the junction 6' on the Peltier element 6 side is heated, while a core 5' facing the junction 7' on the Peltier element 7 side is cooled. This creates a difference in temperature between the arms 4 and 5. The effective refractive index of the heated core 4' is increased. On the other hand, the effective refractive index of the cooled core 5' is lowered. Thus, a difference in effective refractive index is created to create a difference in phase between transmission lights in the course of propagation through the respective arms.

In this case, when a current is allowed to flow so that a phase difference of half wavelength ($\Delta\phi=\pi$) is created, the transmission light recoupled by the output 3-dB directional, i.e., from port 1 to port 3 and from port 2 to port 4.

The principle of the optical switch according to the invention has been described above. However, it is impossible to make the length of the arm 4 and the length of the arm 5 completely identical to each other. In consideration of this fact, when a construction is adopted wherein the length of the arm 4 on the higher temperature side is made somewhat shorter than the length of the arm 5 and the Peltier elements 6, 7 are driven by a very weak current to render the phases of the arms 4, 5 identical to each other, the crosstalk involved in switching for outputting through the crossport can be reduced.

When an n-type Peltier element is used instead of the p-type Peltier element, the heat generating side and the heat absorbing side in the arms are reversed and, in this state, switching is performed. In this case, the arm 4 is cooled, while the arm 5 is heated. Therefore, when the length of the arm 5 on the higher temperature side is made somewhat shorter than the length of the arm 4 and a very weak current is allowed to flow to drive the Peltier element in order to render the phase of the arm 4 identical to the phase of the arm 5, the crosstalk involved in switching for outputting through the crossport can be reduced.

Alternatively, transmission lights may be input through ports 3 and 4 and output from ports 1 and 2.

Further, provision of heat sinks 12, 13 on the upper part of the Peltier elements 6, 7 can improve the flow of heat into the Peltier elements, realizing more efficient heating and cooling.

As is apparent from the foregoing detailed description, in the optical switch according to a preferred embodiment of the invention, Peltier elements 6, 7 respectively comprising thermoelectric semiconductors of the same type (either p-type or n-type) are provided separately from each other on the upper part of the arm 4 and the upper part of the arm 5 and wired electrically in series using a direct current source 10. Therefore, the direction of a temperature change in the arm 4 and the direction of a temperature change in the arm 5 can be made symmetrical with respect to each other (heating on one side and cooling on the other side), enabling the temperature difference to be efficiently created. Therefore, the power consumption involved in the switching can be reduced.

Further, the optical switch comprises a Mach-Zehnder interferometer circuit 1 comprising two 3-dB directional couplers 2, 3 designed according to the wavelength of the transmission light and two arms 4, 5 for connecting the directional couplers 2, 3 to each other. This construction enables switching to be performed more efficiently than an optical switch having Y-branched or other circuits, realizing low extinction ratio and low crosstalk.

Furthermore, since the optical switch basically comprises the Mach-Zehnder interferometer circuit 1, a plurality of input ports can be provided. In addition, bidirectional switching can be performed because bidirectional input and output of light are possible.

In the optical switch according to the above preferred embodiment, the quartz-based optical waveguide is used. However, the waveguide is not limited to this only, and any waveguide may be used so far as it can withstand the generation of heat and the absorption of heat in the Peltier elements 6, 7. Examples of such waveguides include polyimide optical waveguides.

Although in the above preferred embodiment the Peltier elements 6, 7 each comprise either a p-type semiconductor or an n-type semiconductor, any element may be used so far as it has Peltier effect that enables local heating or cooling by bringing the direction of current to a forward direction or a reverse direction. For example, the Peltier element may comprise an element having thermoelectric effect other than described above, for example, an element of dissimilar conductors jointed to each other by a thin film forming technique, such as an element prepared by joining any one of gold, silver, and platinum to copper.

In the invention, elements having Peltier effect are provided respectively on two optical transmission lines, and energizing means is further provided that can energize these elements to generate heat from one of the elements with absorption of heat being created in the other element. Therefore, energization of the two elements having Peltier effect can efficiently create a difference in temperature between the two optical transmission lines, and the difference in refractive index between the two optical transmission lines can be made large, realizing operation at low power consumption.

The optical switch basically comprises a Mach-Zehnder interferometer circuit comprising two directional couplers and two optical transmission lines for connecting the directional couplers to each other. This construction enables a plurality of input ports to be provided. Further, bidirectional input and output of light can be carried out, realizing bidirectional switching. Furthermore, since the switching efficiency can be improved, low extinction ratio and low crosstalk can be realized.

In the invention, the optical transmission line to be heated is shorter than the optical transmission line to be cooled. Therefore, very weak current may be allowed to flow through the two elements having Peltier effect, permitting the phase of light propagating through one of the optical transmission line to be rendered identical to the phase of light propagating through the optical transmission line. This can reduce crosstalk involved in switching of output light output through the crossport.

In the invention, provision of a heat sink on each of the elements can improve the flow of heat into the elements, permitting the optical transmission line to be efficiently heated or cooled.

The invention has been described in detail with particular reference to preferred embodiments, but it will be understood that variations and modifications can be effected within the scope of the present invention as set forth in the appended claims.

What is claimed is:

1. An optical switch comprising:
    a Mach-Zehnder interferometer circuit comprising two directional couplers and two optical transmission lines of different length for connecting the direction couplers to each other;
    elements having Peltier effect provided respectively on the two optical transmission lines; and
    energizing means for energizing the elements so that heat is generated by one of the elements and absorbed by the other element;

the optical transmission line to be heated being shorter than the optical transmission line to be cooled.

2. The optical switch according to claim 1, wherein the elements are either p-type or n-type semiconductors having the same thermoelectric effect.

3. The optical switch according to claim 2, wherein the semiconductor is composed mainly of a p-type $(Bi, Sb)_2Te_3$.

4. The optical switch according to claim 2, wherein the semiconductor is composed mainly of an n-type $Bi_2(Te, Se)_3$.

5. The optical switch according to claim 1, wherein the elements are conductors having the same thermoelectric effect.

6. The optical switch according to claim 5, wherein the conductor comprises dissimilar metals jointed to each other.

7. The optical switch according to claim 6, wherein at least one of the metals is a noble metal.

8. The optical switch according to claim 7, wherein the noble metal is any one of gold, silver, and platinum.

9. The optical switch according to claim 1, wherein the Mach-Zehnder interferometer circuit is provided on a substrate.

10. The optical switch according to claim 1, wherein the optical transmission line is an optical waveguide.

11. The optical switch according to claim 10, wherein the optical waveguide is made of glass composed mainly of quartz.

12. The optical switch according to claim 10, wherein the optical waveguide comprises: a substrate; a cladding provided on the substrate; and a core provided in the interior of the cladding.

13. The optical switch according to claim 12, wherein the core comprises a quartz glass with germanium added thereto and the cladding comprises a quartz glass with germanium not added thereto.

14. The optical switch according to claim 12, wherein the cladding comprises a quartz glass with fluorine added thereto and the core comprises a quartz glass with fluorine not added thereto.

15. The optical switch according to claim 1, wherein the energizing means is a direct current source.

16. The optical switch according to claim 1, wherein a heat sink is provided on the element.

* * * * *